(12) United States Patent
Greenberg et al.

(10) Patent No.: US 6,611,260 B1
(45) Date of Patent: Aug. 26, 2003

(54) ULTRA-HIGH BANDWIDTH MULTI-PORT MEMORY SYSTEM FOR IMAGE SCALING APPLICATIONS

(75) Inventors: Robert Y. Greenberg, Portland, OR (US); Michael G. West, Portland, OR (US)

(73) Assignee: Pixelworks, Inc, Tualatin, OR (US)

( * ) Notice: Subject to any disclaimer, the term of this patent is extended or adjusted under 35 U.S.C. 154(b) by 0 days.

(21) Appl. No.: 09/313,060

(22) Filed: May 17, 1999

Related U.S. Application Data

(60) Provisional application No. 60/086,121, filed on May 20, 1998, and provisional application No. 60/065,445, filed on Nov. 24, 1997.

(51) Int. Cl.[7] .............................................. G09G 5/00
(52) U.S. Cl. ....................... 345/204; 345/212; 345/213
(58) Field of Search ................................. 345/212, 213, 345/196, 204, 536, 545, 558, 560, 660, 667, 668, 669, 670, 671

(56) References Cited

U.S. PATENT DOCUMENTS

| | | | | |
|---|---|---|---|---|
| 4,020,332 A | | 4/1977 | Crochiere et al. ........... 235/152 |
| 4,682,301 A | | 7/1987 | Horiba et al. ................ 364/724 |
| 5,239,628 A | * | 8/1993 | Hasebe et al. ............... 395/325 |
| 5,285,192 A | | 2/1994 | Johary et al. .................... 345/3 |
| 5,335,296 A | * | 8/1994 | Larkin et al. ................. 382/47 |
| 5,355,328 A | | 10/1994 | Arbeiter et al. ........... 364/724.1 |
| 5,608,425 A | * | 3/1997 | Movshovich ................ 345/141 |
| 5,650,955 A | | 7/1997 | Puar et al. ..................... 365/51 |
| 5,703,806 A | | 12/1997 | Puar et al. .................... 365/181 |
| 5,742,261 A | * | 4/1998 | Yuki et al. ....................... 345/3 |
| 5,767,916 A | | 6/1998 | West ............................. 348/537 |
| 5,790,096 A | | 8/1998 | Hill, Jr. ....................... 345/150 |
| 5,805,233 A | | 9/1998 | West ............................. 348/537 |
| 5,900,917 A | * | 5/1999 | Yanai et al. .................. 348/584 |
| 5,920,659 A | * | 7/1999 | Iverson et al. ............... 382/298 |
| 5,977,933 A | * | 11/1999 | Wicher et al. .................. 345/3 |
| 6,008,794 A | * | 12/1999 | Ishii ............................. 345/150 |
| 6,025,853 A | * | 2/2000 | Baldwin ....................... 345/506 |
| 6,064,359 A | * | 5/2000 | Lin et al. ....................... 345/89 |
| 6,064,404 A | * | 5/2000 | Aras et al. .................... 345/507 |
| 6,088,045 A | * | 7/2000 | Lumelsky et al. ........... 345/509 |
| 6,125,199 A | * | 9/2000 | Sato et al. .................... 358/518 |
| 6,175,592 B1 | * | 1/2001 | Kim et al. .................... 348/616 |
| 6,204,887 B1 | * | 3/2001 | Hiroi ............................ 348/565 |

OTHER PUBLICATIONS

TRW LSI Products Inc.; CMOS Image Resampling Sequencer; 11/90; Rev. F 40G05061 (pp. 21–39).

\* cited by examiner

Primary Examiner—Vijay Shankar
(74) Attorney, Agent, or Firm—Marger Johnson & McCollom, PC

(57) ABSTRACT

The image scaling memory system of the present invention eliminates the use of internal or external line memories by using an existing frame memory coupled with an input buffer and a plurality of output buffers for providing a vertical scalar with simultaneous parallel access to multiple lines of data. Additionally, the image scaling memory system of the present invention, including the frame memory, is embedded into an integrated circuit. Thus, the image scaling circuit of the present invention improves reliability, lowers cost, and improves silicon area usage. The frame memory is coupled to an input buffer at an input side and a plurality of output buffers at an output side. The plurality of output buffers is positioned between the frame memory and the vertical scalar. Each output buffer sequentially gains access to and transfers portions of image lines from the frame buffer. Each output buffer stores only a portion of an image line resulting in relatively small output buffers. The plurality of output buffers provides the vertical scalar with simultaneous parallel access to multiple lines of buffered digital image data. The frame memory preferably comprises DRAM that stores the image data such that row faults are minimized. The DRAM frame memory preferably includes at least two memory banks, each including a plurality of rows and a plurality of columns. The DRAM frame memory has multiple purposes including storing digital image data frames for sample rate conversion, as well as, storing bitmaps for access by an On Screen Display controller and storing microprocessor data for access by a microprocessor.

29 Claims, 13 Drawing Sheets

| | BANK 0 | | | |
|---|---|---|---|---|
| | COLUMN 0–15 | COLUMN 16–31 | COLUMN 32–47 | COLUMN 48–63 |
| ROW 0 | LINE 0 PIXELS 0–255 | LINE 1 PIXELS 0–255 | LINE 2 PIXELS 0–255 | LINE 3 PIXELS 0–255 |
| ROW 1 | LINE 0 PIXELS 256–511 | LINE 1 PIXELS 256–511 | LINE 2 PIXELS 256–511 | LINE 3 PIXELS 256–511 |
| ROW 2 | LINE 0 PIXELS 512–767 | LINE 1 PIXELS 512–767 | LINE 2 PIXELS 512–767 | LINE 3 PIXELS 512–767 |
| ROW 3 | LINE 0 PIXELS 768–1023 | LINE 1 PIXELS 768–1023 | LINE 2 PIXELS 768–1023 | LINE 3 PIXELS 768–1023 |
| ROW 4 | LINE 8 PIXELS 0–255 | LINE 9 PIXELS 0–255 | LINE 10 PIXELS 0–255 | LINE 11 PIXELS 0–255 |
| ROW 5 | LINE 8 PIXELS 256–511 | LINE 9 PIXELS 256–511 | LINE 10 PIXELS 256–511 | LINE 11 PIXELS 256–511 |
| ROW 6 | LINE 8 PIXELS 512–767 | LINE 9 PIXELS 512–767 | LINE 10 PIXELS 512–767 | LINE 11 PIXELS 512–767 |
| ROW 7 | LINE 8 PIXELS 768–1023 | LINE 9 PIXELS 768–1023 | LINE 10 PIXELS 768–1023 | LINE 11 PIXELS 768–1023 |
| ROW 380 | LINE 760 PIXELS 0–255 | LINE 761 PIXELS 0–255 | LINE 762 PIXELS 0–255 | LINE 763 PIXELS 0–255 |
| ROW 381 | LINE 760 PIXELS 256–511 | LINE 761 PIXELS 256–511 | LINE 762 PIXELS 256–511 | LINE 763 PIXELS 256–511 |
| ROW 382 | LINE 760 PIXELS 512–767 | LINE 761 PIXELS 512–767 | LINE 762 PIXELS 512–767 | LINE 763 PIXELS 512–767 |
| ROW 383 | LINE 760 PIXELS 768–1023 | LINE 761 PIXELS 768–1023 | LINE 762 PIXELS 768–1023 | LINE 763 PIXELS 768–1023 |

FIG.4A

| | BANK 1 | | | |
|---|---|---|---|---|
| | COLUMN 0-15 | COLUMN 16-31 | COLUMN 32-47 | COLUMN 48-63 |
| ROW 0 | LINE 4 PIXELS 0-255 | LINE 5 PIXELS 0-255 | LINE 6 PIXELS 0-255 | LINE 7 PIXELS 0-255 |
| ROW 1 | LINE 4 PIXELS 256-511 | LINE 5 PIXELS 256-511 | LINE 6 PIXELS 256-511 | LINE 7 PIXELS 256-511 |
| ROW 2 | LINE 4 PIXELS 512-767 | LINE 5 PIXELS 512-767 | LINE 6 PIXELS 512-767 | LINE 7 PIXELS 512-767 |
| ROW 3 | LINE 4 PIXELS 768-1023 | LINE 5 PIXELS 768-1023 | LINE 6 PIXELS 768-1023 | LINE 7 PIXELS 768-1023 |
| ROW 4 | LINE 12 PIXELS 0-255 | LINE 13 PIXELS 0-255 | LINE 14 PIXELS 0-255 | LINE 15 PIXELS 0-255 |
| ROW 5 | LINE 12 PIXELS 256-511 | LINE 13 PIXELS 256-511 | LINE 14 PIXELS 256-511 | LINE 15 PIXELS 256-511 |
| ROW 6 | LINE 12 PIXELS 512-767 | LINE 13 PIXELS 512-767 | LINE 14 PIXELS 512-767 | LINE 15 PIXELS 512-767 |
| ROW 7 | LINE 12 PIXELS 768-1023 | LINE 13 PIXELS 768-1023 | LINE 14 PIXELS 768-1023 | LINE 15 PIXELS 768-1023 |
| ROW 380 | LINE 764 PIXELS 0-255 | LINE 765 PIXELS 0-255 | LINE 766 PIXELS 0-255 | LINE 767 PIXELS 0-255 |
| ROW 381 | LINE 764 PIXELS 256-511 | LINE 765 PIXELS 256-511 | LINE 766 PIXELS 256-511 | LINE 767 PIXELS 256-511 |
| ROW 382 | LINE 764 PIXELS 512-767 | LINE 765 PIXELS 512-767 | LINE 766 PIXELS 512-767 | LINE 767 PIXELS 512-767 |
| ROW 383 | LINE 764 PIXELS 768-1023 | LINE 765 PIXELS 768-1023 | LINE 766 PIXELS 768-1023 | LINE 767 PIXELS 768-1023 |

FIG.4B

ULTRA-HIGH BANDWIDTH MULTI-PORT MEMORY SYSTEM FOR IMAGE SCALING APPLICATIONS

This application claims priority from U.S. patent application Ser. No. 09/198,314, filed Nov. 23, 1998, that claims priority from U.S. Prov. Appln. No. 60/065,445, filed Nov. 24, 1997, and U.S. Prov. Appln. No. 60/086,121, filed May 20, 1998, all incorporated herein by reference.

BACKGROUND OF THE INVENTION

1. Field of the Invention

This invention relates to a memory system for the visual display of digital image data and, more particularly, to an embedded ultra-high bandwidth multi-port memory system for ok digital image scaling applications.

2. Description of the Prior Art

Digital image data generally defines one or more frames. A frame is an image displayed for viewing on a display or panel at one time, i.e., one frame of data fits on the display screen or panel. Each frame includes a rectangular array of pixels. Each pixel has one or more values, for example, a gray scale value for a monochrome display or RGB values for a color display. The resolution of the array, i.e., the number of horizontal and vertical pixels, can also be referred to as the image sample rate or resolution. Common display resolutions include that shown in Table 1 indicating, in the second and third columns, the number of pixels in the vertical and horizontal dimensions, respectively:

TABLE 1

| | | |
|---|---|---|
| VGA | 640 | 480 |
| SVGA | 800 | 600 |
| XGA | 1024 | 768 |
| SXGA | 1280 | 1024 |
| UXGA | 1600 | 1200 |
| HDTV | 1280 | 720 |

Where the resolution or sample rate of the display device matches the resolution of the image data, the data can be displayed directly; if not, it is desirable in many cases that the image be appropriately scaled. Scaling can be done in either vertical or horizontal or both dimensions, and the sample rates can be scaled up or down. Increasing the size a digital image (scaling up) is accomplished by introducing additional pixels in either or both the vertical and horizontal directions. The additional pixels can be introduced by linearly interpolating between two existing pixels or by using more sophisticated techniques such as multi-rate Finite Impulse Response (FIR) filters. The use of FIR filters to accomplish vertical and horizontal scaling is described in U.S. Pat. Nos. 4,020,332 to Crochiere, et al., 4,682,301 to Hiroba et al., and 5,355,328 to Arbeiter, et al., all incorporated herein by reference.

FIG. 1 illustrates the relationship of input to output pixels when a FIR filter is used to vertically and horizontally scale an input image. Assume a FIR filter includes 3 multipliers (not shown). In this case, 9 pixels of the input image data contribute to the value of each output pixel. A vertical image scaling circuit (not shown) generates pixel 79 from pixels 70, 71, and 72, pixel 80 from pixels 73, 74, and 75, pixel 81 from pixels 76, 77, and 78, and so on. The vertically scaled image is then provided to a horizontal image scaling circuit (not shown) that generates pixel 82 from pixels 79, 80, and 81. A primary goal of scaling is to maintain the integrity of the image by avoiding distortion due to, e.g., keystoning, warping, or other such effects. Scaling becomes particularly important in connection with pixelated display systems—devices such as liquid crystal display (LCD) projectors, flat panel monitors, plasma displays (PDP), field emissive displays (FED), electro-luminescent (EL), micro-mirror technology displays (e.g., DMD), etc.—that have a fixed pixel structure.

FIG. 2 is a block diagram of a conventional vertical image scaling circuit 10. A conventional image scaling circuit 10 includes a plurality of line memories such as line memories LM1, LM2, . . . LMi coupled to a vertical scalar 12. Digital image data 11 is input to the line memory LM1 as a stream of pixels representing an image to be scaled and ultimately displayed. To properly scale the digital image data 11 in a vertical dimension, the vertical scalar circuit 12 must have simultaneous parallel access to multiple lines of the digital input data 11 as explained above. Each line memory, e.g., LM1, stores a line of the digital image. Thus, the multiple line memories LM1, LM2, . . . LMi provide the necessary simultaneous parallel access by storing sequential lines of the digital image for a predetermined image frame. The line memories LM1, LM2, . . . LMi are serially connected, that is, line memory LM1 is serially connected to line memory LM2, which is serially connected to line memory LM3, and so on. The vertical image scalar 12 scales the digital image data 11 and provides the scaled data 13 directly to a display device, a horizontal image scalar (not shown), or other circuit block for further processing. Line memories, like line memories LM1, LM2, . . . LMi, are generally large Static Random Access Memory (SRAM) devices capable of storing complete lines of digital image data.

Generally, vertical scalars, like scalar 12, are embedded in Application Specific Integrated Circuits (ASICs) designed for the specific application envisioned, vertically scaling digital images in this case. In addition to line memories, conventional vertical scalar ASICs use external Dynamic Random Access Memory (DRAM) type memory for certain other applications, e.g., frame rate conversion. Thus, vertical scalar ASICs of the type shown in FIG. 1 require both SRAM for the line memories and external DRAM for other applications. The separate SRAM and DRAM requirements increase design complexity, which necessarily increases defect and failure potential. Moreover, the separate large SRAM required for the line memories is often embedded into the vertical scalar ASICs. If embedded, the large SRAM line memory devices use up valuable and costly silicon area.

Accordingly, a need remains for improvements in image scaling methods and apparatus. In particular, a need remains for a simplified image scaling memory system that improves reliability, lowers cost, and improves silicon area usage.

SUMMARY OF THE INVENTION

The image scaling memory system of the present invention eliminates the use of internal or external line memories by using an existing frame memory coupled with an input buffer and a plurality of output buffers for providing a vertical scalar with simultaneous parallel access to multiple lines of data. Additionally, the image scaling memory system of the present invention, including the frame memory, is embedded into an integrated circuit. Thus, the image scaling circuit of the present invention improves reliability, lowers cost, and improves silicon area usage.

The frame memory is coupled to an input buffer at an input side and a plurality of output buffers at an output side. The input buffer packs input data pixels to form data words. Once a predetermined number of data words are stored, the input buffer transfers the stored data words to the frame memory. The plurality of output buffers is coupled to the frame memory and the vertical scalar. Each output buffer sequentially gains access to and transfers portions of image lines from the frame buffer. Each output buffer stores only a portion of an image line resulting in relatively small output buffers. The plurality of output buffers provides the vertical scalar with simultaneous parallel access to sequential lines of buffered digital image data. The input and output buffers are preferably implemented using First-In First-Out (FIFO) buffers.

The frame memory preferably comprises DRAM that stores the image data such that row faults are minimized. However, the frame memory may include other suitable memory types, e.g., SRAM. The DRAM frame memory preferably includes at least two memory banks, each including a plurality of rows and a plurality of columns. Each row of the DRAM frame memory contains digital data from multiple lines and stores portions of a plurality of digital data line such that corresponding portions of sequential digital data lines are stored in no more than one row in each bank thereby minimizing row faults. Only one row per bank is active at any given time. There are preferably at least N-1 partial image lines stored in each row of the DRAM frame memory to minimize the row fault rate, where N is the number of lines simultaneously required by the vertical scalar to vertically scale the digital image data. The DRAM frame memory includes an image portion for storing the digital image data frames, an On Screen Display (OSD) portion for storing OSD bitmaps for access by an OSD controller, a microprocessor portion for storing microprocessor data for access by a microprocessor, or a combination thereof.

Another embodiment of the present invention is a vertical scaling circuit embedded in an integrated circuit for vertically scaling digital data of a pixelated image. The vertical scaling circuit comprises a frame memory for storing the digital data, the digital data being divided into a plurality of frames, each frame including a plurality of lines. A plurality of output buffers is coupled to the frame memory. Each output buffer stores at least a portion of a selected line. A vertical scalar is coupled to the plurality of output buffers for vertically scaling the pixelated image by simultaneously parallel accessing the portions of the selected lines stored in each of the output buffers. The vertical scalar can be implemented using a variety of techniques including, but not limited to, the FIR filter techniques described herein.

As mentioned above, the frame memory is preferably DRAM memory but can comprise other similar memory types, e.g., SRAM. Where DRAM is used, the frame memory preferably comprises at least two memory banks, each including a plurality of rows and columns. Each row stores portions of sequential digital image data lines. Row faults are minimized by storing sequential digital data lines in no more than one row in each bank. The DRAM frame memory includes an image portion for storing the digital image frames, an OSD portion for storing OSD bitmaps for access by an OSD controller, a microprocessor portion for storing microprocessor data for access by a microprocessor, or a combination thereof.

The vertical scaling circuit further includes an input buffer coupled to an input side of the frame memory for buffering the digital image data. The input buffer is also embedded in the integrated circuit. The frame memory includes an output port. Each output buffer sequentially accesses the frame memory through the output port and buffers portions of image lines stored therein. The input and plurality of output buffers are preferably implemented using FIFO buffers.

A method for vertically scaling data representative of a pixelated digital image is provided. The method comprises embedding a frame memory and a vertical scalar in an integrated circuit, storing the data in the frame memory, transferring portions of selected data lines from the frame memory to a corresponding output buffer until a plurality of output buffers stores corresponding portions of sequential digital data lines, and simultaneous parallel accessing the portions of selected data lines stored in the plurality of output buffers.

Storing the data in the frame memory includes storing the data in a DRAM memory. Storing the data in the frame memory includes storing the data in at least two memory banks, each bank including a plurality of rows and columns. Each row stores corresponding portions of sequential digital data lines such that corresponding portions of sequential digital data lines are stored in no more than one row in each bank thereby minimizing row faults.

Storing the digital data in the frame memory includes storing a digital data frame in the frame memory for conversion from an input refresh rate to an output refresh rate, storing OSD bitmaps in the frame memory, or storing microprocessor data in the frame memory.

The frame memory includes an output port. Transferring portions of selected digital data lines includes having each output buffer sequentially access the output port. The method further includes buffering the data in an input buffer. The input buffer and the plurality of output buffers are preferably implemented using FIFO buffers.

BRIEF DESCRIPTION OF THE DRAWINGS

The foregoing and other objects, features, and advantages of the invention will become more readily apparent from the following detailed description of a preferred embodiment that proceeds with reference to the following drawings.

FIGS. 4A and 4B are a block diagram of an example organization of the frame memory shown in FIG. 3;

DETAILED DESCRIPTION OF THE PREFERRED EMBODIMENT

Figure 3:
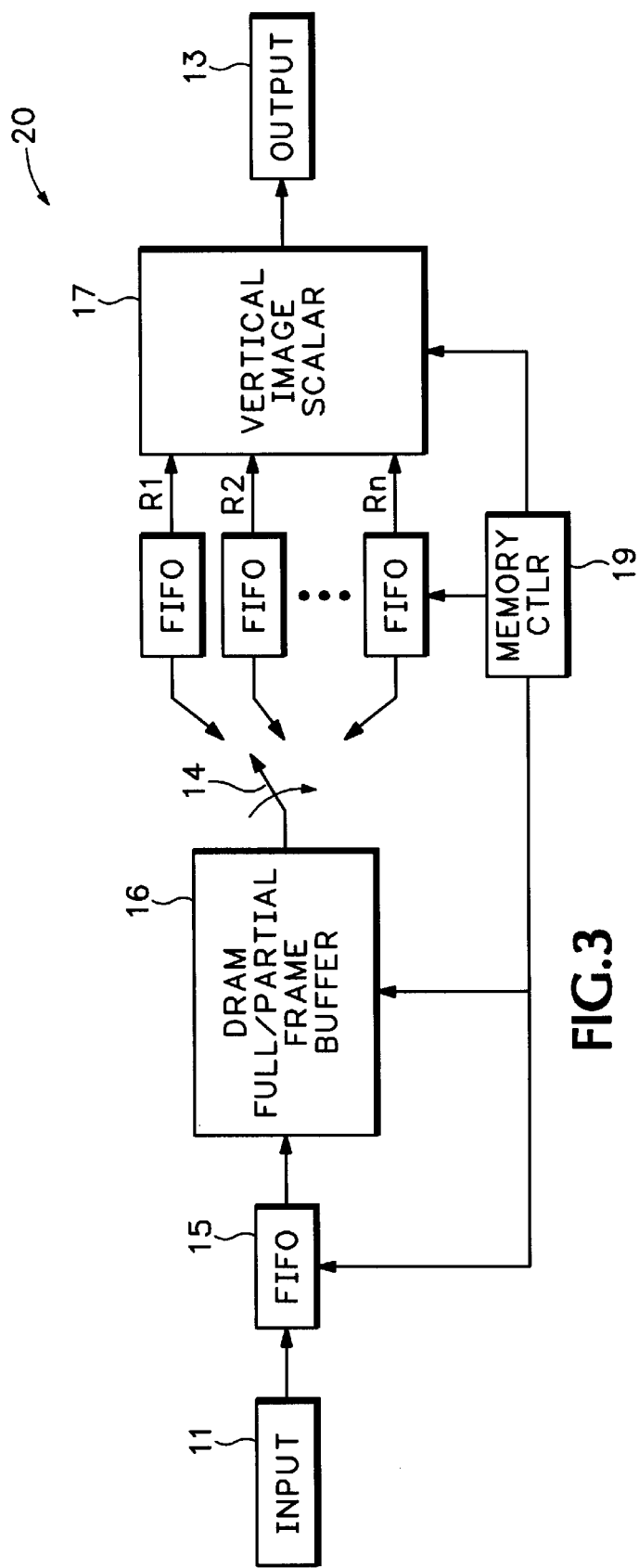
FIG. 3 is a block diagram of an image scaling circuit of the present invention.

FIG. 3 is a block diagram of an image scaling circuit 20 of the present invention. At the heart of the image scaling circuit 20 is the multipurpose frame memory 16. The multipurpose frame memory 16 is coupled to an input buffer 15 at an input side and to a plurality of output buffers, like registers R1, R2, . . . Rn, at an output side. The plurality of output buffers R1, R2, . . . Rn are directly coupled to a vertical image scalar 17 for scaling the digital image data 11 in a vertical direction. The digital image data 11 is a stream of pixels representing an image to be scaled and ultimately displayed. The vertical image scalar 17 generates the digital output signal 13 by vertically scaling the buffered digital image data provided by the plurality of output buffers R1, R2, . . . Rn. Packet based transfer of the digital image data 11 is made possible by surrounding the frame memory 16 with small registers like input buffer 15 and the plurality of output buffers R1, R2, . . . Rn. The frame memory preferably comprises DRAM type memory that stores the image data such that row faults are minimized. However, the frame memory may include other suitable memory types, e.g., SRAM.

As explained in detail below, the input buffer 15 and the plurality of output buffers R1, R2, . . . Rn minimize the time penalty incurred when switching between data input and data output. The key impediment to the frame memory 16 is that it includes a single access port 14. The single access port 14 limits accesses to the frame memory 16 to one unit, e.g., one word, every clock cycle. However, the vertical scalar 17 needs simultaneous parallel access to multiple lines of image data to vertically scale the image. The plurality of output buffers R1, R2, . . . Rn provides the vertical scalar 17 with such simultaneous parallel access. The output buffers R1, R2, . . . Rn function as miniature line memories thereby transforming the frame memory 16 into a multi-port high bandwidth serial access memory.

The frame memory 16 is divided into different portions. The frame memory 16 includes an image portion for storing the digital image frames, an OSD portion for storing OSD bitmaps for access by an OSD controller, a microprocessor portion for storing microprocessor data for access by a microprocessor, or a combination thereof. A person skilled in the art should recognize that the above-described frame memory portions might be distinct, overlap, and/or combined.

As its name suggests, the multipurpose frame memory 16 is used to accomplish several different functions, e.g., frame rate conversion, frame dropping, image compression, and image scaling. Frame rate conversion involves converting the refresh rate of the digital image data 11 to accommodate the limited refresh rate range of many displays. Thus, the multipurpose frame memory 16 allows the refresh rate of the digital image data signal 11 to be different than the refresh rate of the digital output signal 13. For example, the digital image data 11 received from a typical personal computer graphics card varies from 60 Hz to 100 Hz while the display device may require an output signal 13 having a fixed 60 Hz refresh rate.

Input signals having high resolutions can be double buffered or frame dropped, i.e., inhibit the capture of frames for a limited time, to eliminate frame tear when the input and display refresh rates are different. The frame memory 16 includes an intelligent image compression feature and an interlaced RGB image capture feature. The intelligent image compression feature compresses image pixels from 24 bits per pixel down to 16 bits per pixel or from 24 bits per pixel down to either 19 or 12 bits per pixel with negligible loss of image quality. The frame memory 16 includes sufficient memory storage for on screen display (OSD) bitmaps. However, a primary purpose of the frame memory 16 remains buffering the data for scaling in both vertical and horizontal dimensions.

Figure 1:
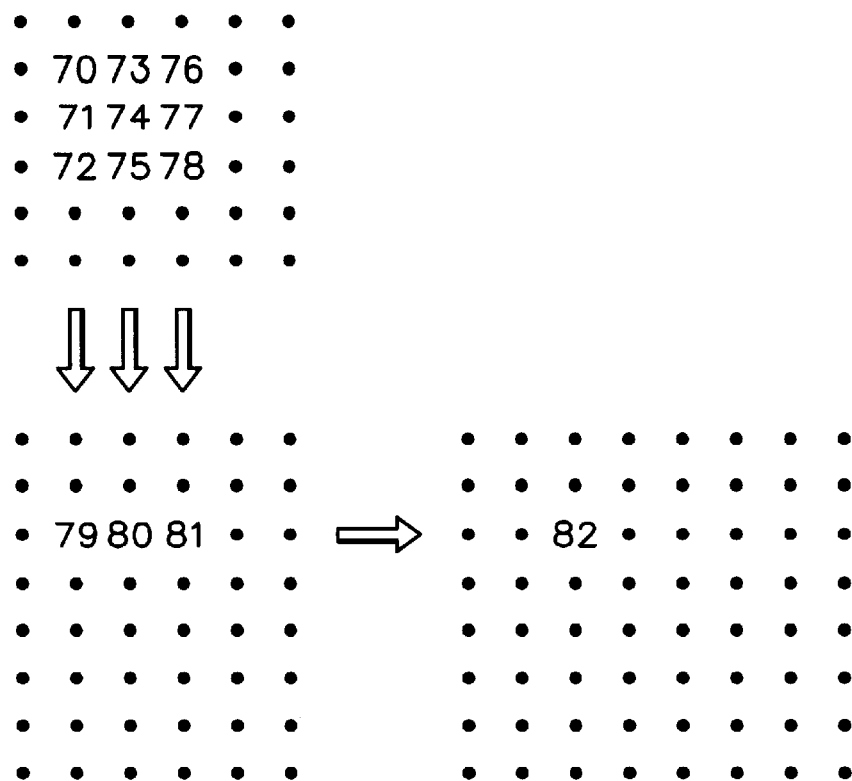
FIG. 1 is an example of mapping of input pixels to output pixels.
Figure 2:
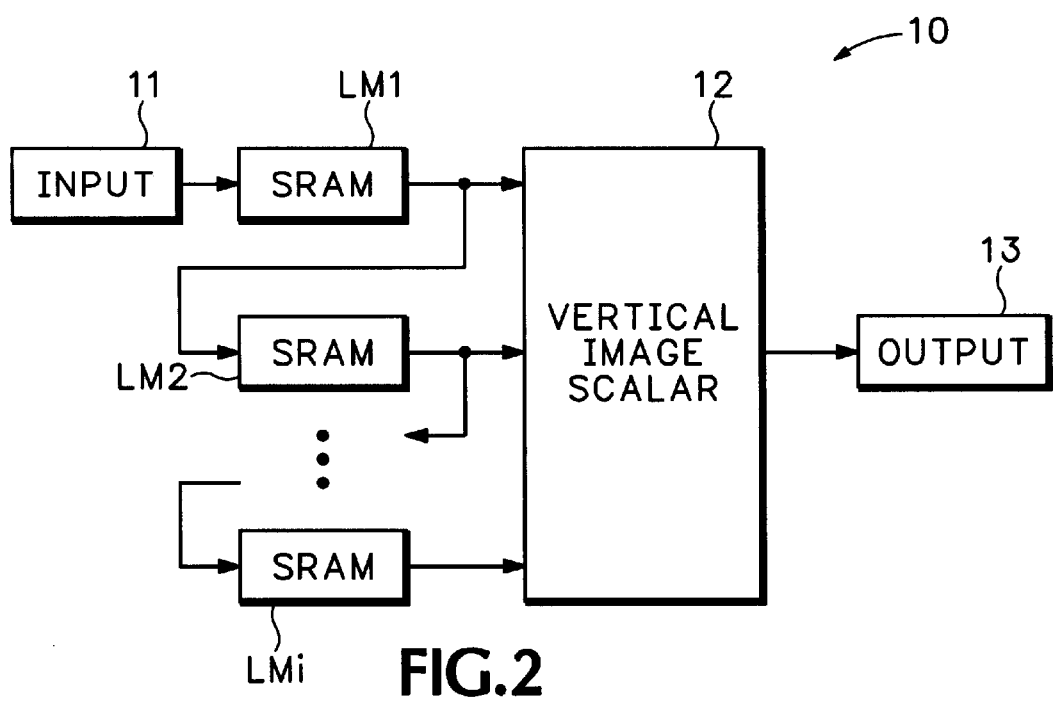
FIG. 2 is a block diagram of a conventional image scaling circuit.

The frame memory 16 contains enough memory to store a frame of digital image data 11. For example, the frame memory 16 contains 16 Mbits of high-speed DRAM with a 256-bit internal data bus. The buffer can store up to SXGA (1280×1024) images at 24 bits per pixel or UXGA (1600× 1200) or HDTV (1920×1080) images at 16 bits per pixel. The frame memory 16 is included in a monolithic integrated circuit that includes other blocks of the image scaling circuit 20 shown in FIG. 3 as well as other subsystems shown in FIG. 5. By eliminating the SRAM line memories LM1, LM2, . . . LMi used in the conventional image scaling circuit 10 (FIG. 2), the present invention saves significant silicon area and cost.

The image scaling circuit 20 operates in the following manner. The digital image data 11 is received as a serial stream of image pixel data at input buffer 15. The input buffer 15 writes or captures pixels one at a time from the digital image data 11. Once a sufficient number of pixels are packed, the input buffer 15 reads or bursts the captured pixels to the go frame memory 16. For example, assume a memory word comprises sixteen 16-bit pixels. The input buffer 15 captures (writes) sixteen pixels or more before bursting out (reading) a word or plurality of words to the frame memory 16.

The frame memory 16 stores the digital image data 11 and provides the buffered digital image data to the plurality of output buffers R1, R2, . . . Rn. The plurality of output buffers R1, R2, . . . Rn, in turn, provide parallel access to multiple lines of buffered digital image data to the vertical scalar 17.

Where the frame memory 16 comprises DRAM memory, each row of the frame memory 16 contains digital data from multiple lines. The frame memory 16 includes at least two memory banks to minimize row faults. Only one row per bank is active at any given time. When a row must be activated, there is a multiple clock cycle penalty, e.g., 8 clocks. The frame memory 16 includes a single output port 14. The output buffers R1, R2, . . . Rn sequentially access the frame memory 16 through the single port 14 in a round robin fashion. In the preferred embodiment, the frame memory 16 transfers one memory word representative of a portion of an image line to an output buffer per output register access.

The output buffers R1, R2, . . . Rn thus contain portions of image data from multiple lines thereby minimizing the overall register depth. This is because each output buffer, e.g., R1, receives new data more frequently than if a packet transfer methodology were used to supply data to the output buffers R1, R2, . . . Rn. The currently preferred output buffers are First-In, First-Out (FIFO) registers 6 words deep, i.e., about 96 pixels deep—assuming 16 pixels/word. A person skilled in the art should recognize that the size and type of the input and output buffers can vary depending on the specific scaling system being designed.

FIGS. 4A and 4B illustrate one possible organization for the frame memory 16. Referring to FIG. 4, the frame memory 16 comprising DRAM type memory is organized as 2 banks each having 384 rows and 64 columns. Assume each memory word stores sixteen 16-bit pixels, i.e., there are 256 bits/word. Each row stores data for multiple lines of the digital image. For example, row 0 in bank 0 includes data for lines 0, 1, 2, and 3 and row 0 in bank 1 includes data for lines 4, 5, 6, and 7. Similarly, row 4 in bank 0 includes data for lines 8, 9, 10, and 11 and row 4 in bank 1 includes data for lines 12, 13, 14, and 15, and so on. Two memory banks are employed to optimize memory bandwidth; only one row per memory bank is active at any given time. In this example, the two memory banks allow between 16 and 32 column transfers from each line depending on the starting column in the row with a maximum of one row fault per line. This row fault rate is maintained for a vertical scalar 17 that requires up to five lines at a time, assuming the pixels are read in a round robin fashion from each image line. More generally, there must be at least N−1 partial image lines stored in each row of the frame memory 16 to minimize the row fault rate, where N is the number of lines required by the vertical scalar 17 to vertically scale the digital image data 11. Thus, no matter which sequential lines the vertical scalar 17 requests, there is never a case where those sequential lines are in two rows of the same bank thereby preventing row faults. The above-described memory organization minimizes the output buffer depth because only portions of lines—not complete lines—are stored therein.

The output buffers R1, R2, . . . Rn sequentially access the frame memory 16 in the following exemplary manner. Assume five output buffers and a frame memory organization as shown in FIGS. 4A and 4B. An output register R1 accesses the frame memory 16 and transfers the first word from line 2, row 0, bank 1. Then, output register R2 accesses the frame memory 16 and transfers the first word from line 3, row 0, bank 0 followed by output register R3 accessing the frame memory 16 and transferring the first word from line 4, row 0, bank 1. Then output register R4 accesses frame memory 16 and transfers the first word from line 5, row 0, bank 1 followed by register R5 accessing frame memory 16 and transferring the first word from line 6, row 0, bank 1. Since one row per bank is active at any given time—row 0 from banks 0 and 1—and all necessary lines are contained within the two active rows, row faults are minimized.

The vertical scalar 17 requests words from memory by issuing a memory request to the memory controller 19. The memory controller 19 arbitrates access to the frame memory 16 from subsystems within the image scaling circuit 20 including the vertical image scalar 17, the plurality of output buffers R1, R2, . . . Rn, and the input buffer 15. The memory controller 19 also arbitrates access to the frame memory 16 from the circuit blocks shown in FIG. 14 including the OSD controller 160 and the microprocessor 135. The memory controller 19 dynamically allocates the available memory bandwidth to ensure that the instantaneous pixel bandwidth requirement of each functional unit is met. The subsystems request memory access with logical addresses that are translated by the memory controller 19 to physical memory addresses within the frame memory 16. Thus, the request is made in terms of image word and line number. The memory controller 19 maps the word and line number into memory addresses designating corresponding memory rows, columns, and banks. In the preferred embodiment, up to five different subsystems, including those shown in FIG. 14, can access the frame memory 16 simultaneously.

Note that the vertical scalar 17 requests memory words because all of the pixels in these words will be required to produce an output line that is scaled in both the vertical and horizontal dimensions. Additionally, the vertical scalar requests words from memory ahead of when the data is actually used. The vertical scalar 17 scales the image only in the vertical dimension resulting in the horizontal output dimension of the vertically scaled image being equal to its horizontal input dimension. For example, assume the input image is 640×480 pixels and we desire a scaled output image having 1024×768 pixels. The vertical scalar 17 will produce output image data 13 having 640×768 pixels. Thus, each line of the output image contains 640 pixels same as the input image. These pixels are contiguous in the horizontal dimension such that each pixel in a word is used once for a given vertically-scaled output image followed by the next output until all the pixels in a word have been processed.

Once the vertical scalar 17 finishes processing a word, the vertical scalar 17 moves on to the next word by, for example, advancing a read pointer for a corresponding output buffer. Where a plurality of FIFOs is used to implement the plurality of output buffers, the vertical scalar 17 simply requests and packs memory words in order into the output buffers. The vertical scalar 17 then reads pixels out one at a time, i.e., one from each output buffer every clock cycle, until all the pixels in a word have been processed. If any one of the output buffers R1, R2, . . . Rn are empty, the vertical scalar 17 stalls until data is available. In other words, each output buffer, e.g., R1, receives one word per clock from frame memory 16 at an input terminal, each word including a predetermined number of pixels, and produces one pixel per clock at an output terminal. If five lines are required to scale the image in the vertical dimension, five output buffers each produce one pixel clock, i.e., the five registers operate in parallel. Thus, the plurality of output buffers have an input bandwidth that is greater than or equal to its output bandwidth ensuring that the output buffers receive new data before going empty.

Figure 5:
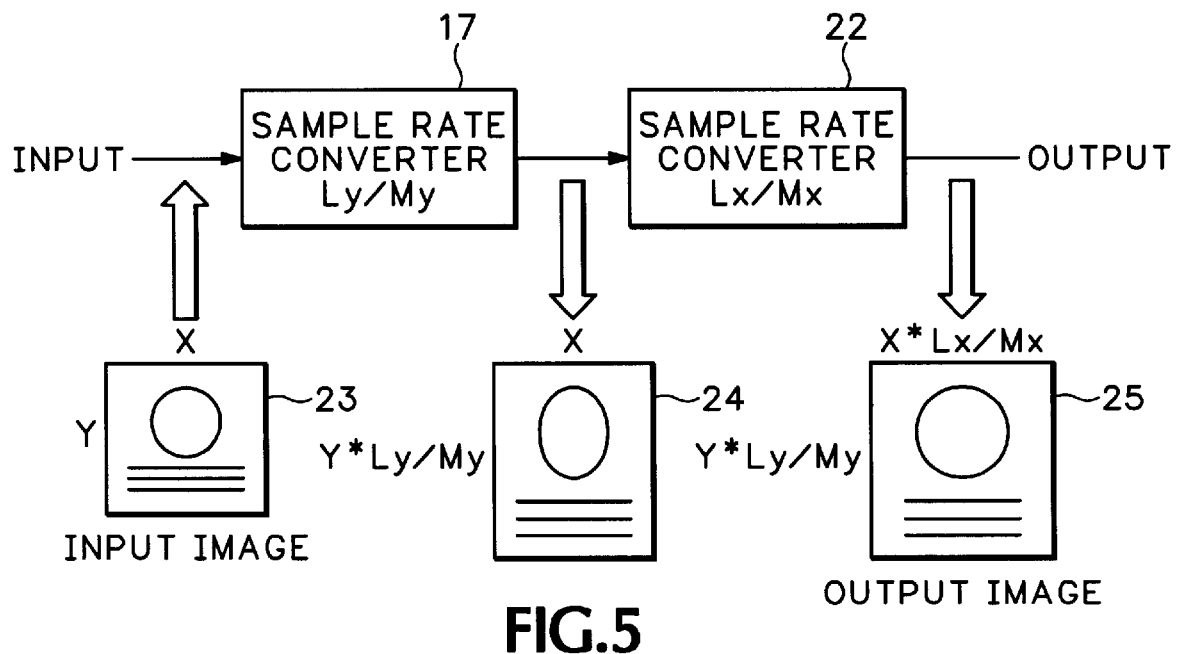
FIG. 5 is a simplified block diagram that illustrates resizing an image up or down using sample rate converters.

FIG. 5 depicts a circuit for dimensioning an image using a vertical and a horizontal image scaling circuits or sample rate converters. A person skilled in the art should recognize that the vertical and horizontal scalars 17 and 22, respectively, could be implemented using a variety of techniques including simple techniques like linear interpolation and more sophisticated techniques like those described below. Vertical scalar 17 enlarges or reduces an image 23 by a factor of Ly/My in the vertical dimension, producing image 24. Horizontal scalar 22 performs the same function in the horizontal dimension, enlarging or reducing image 24 by a factor of Lx/Mx in the horizontal direction producing, in turn, image 25. In the prior art, the scale factors Ly, My, Lx, and Mx are integers. According to the present invention, the up sample scale factor Ly is an integer and the down sample scale factor My is a decimal number of arbitrary precision. Likewise in the horizontal dimension, Lx is an integer and Mx is a decimal number of arbitrary precision. The order of the sample rate converters 21 and 22 is interchangeable.

Figure 7:
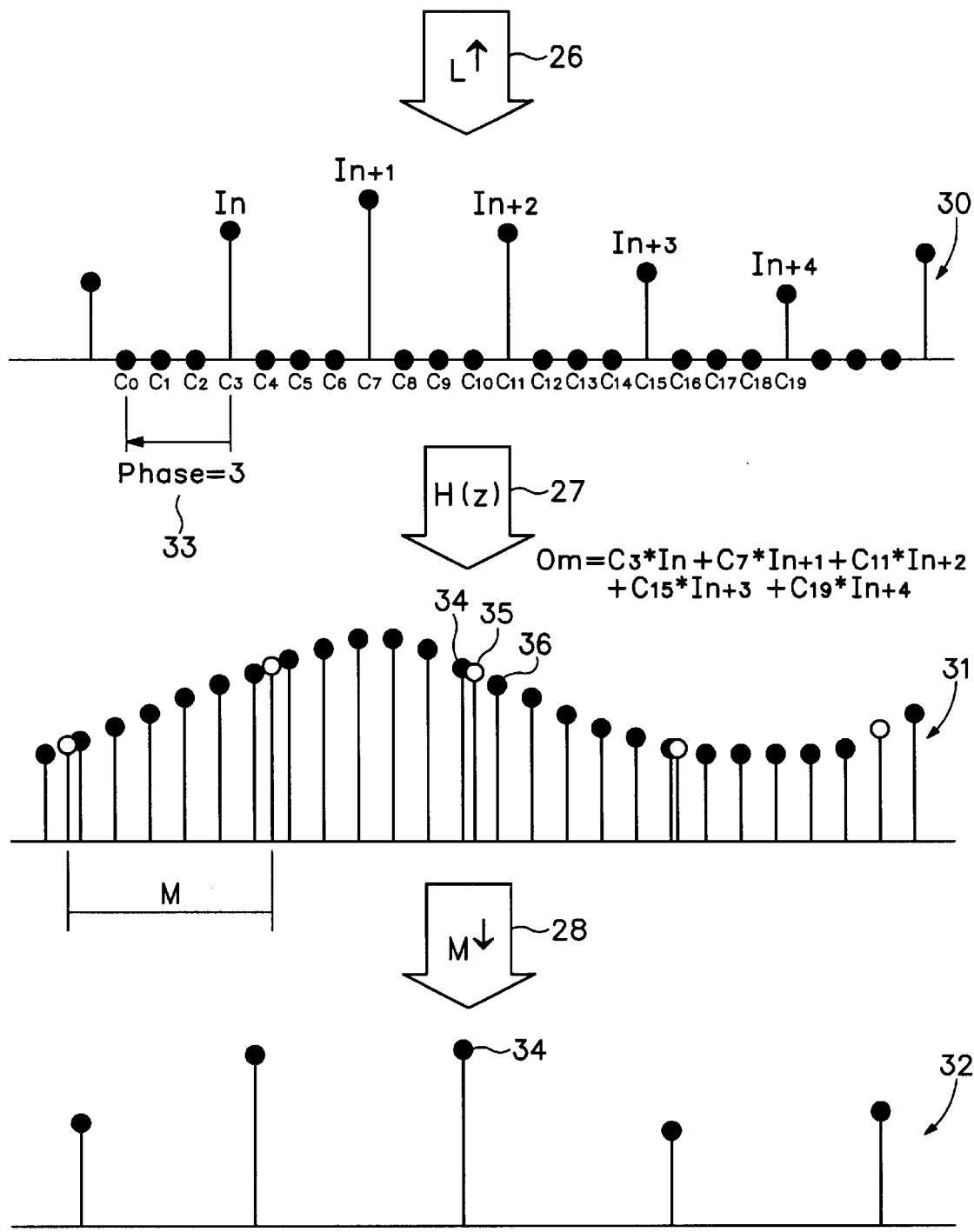
FIG. 7 illustrates the functions of an up sampler, low pass filter, and decimal down sampler according to the present invention.
Figure 8:
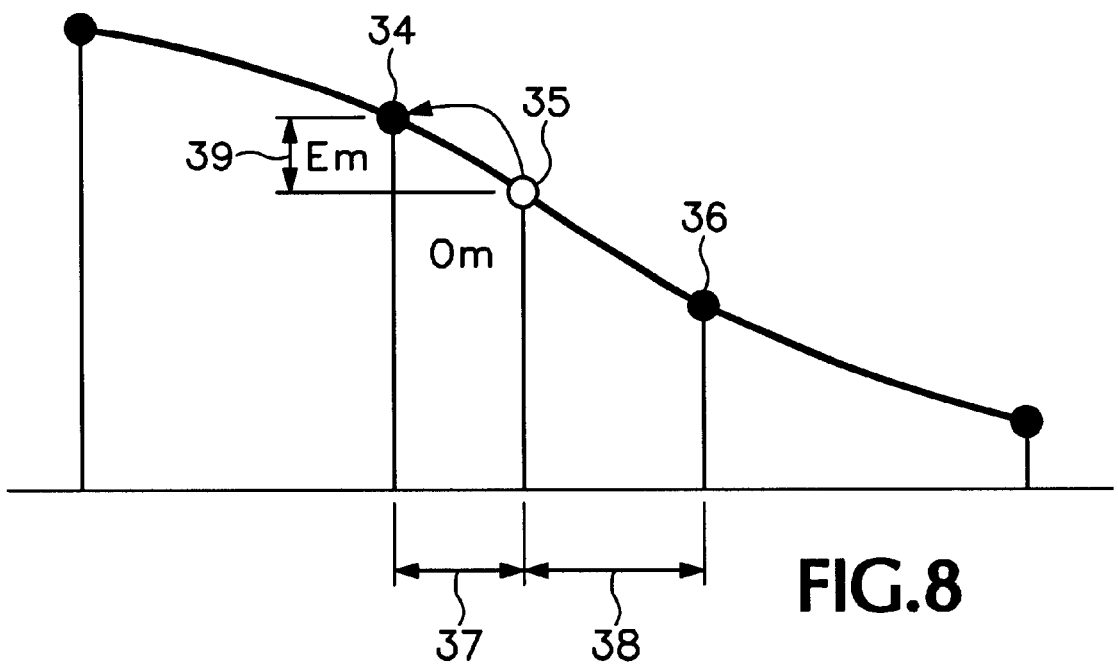
FIG. 8 illustrates the operation of the decimal down sampler and the resulting error terms.

The scalars 17 and 22 shown in FIG. 5 according to the present invention each include an up sampler 26, a low pass FIR filter 27, and a decimal down sampler 28. The up sampler 26 transforms the input coordinate space 29 (a serial stream of pixel data) into an intermediate up sampled space 30 by inserting (L−1) zeros as illustrated in FIG. 7. Again referring to FIG. 7, the FIR filter 27 transforms the up sampled data 30 into the interpolated result 31. Every $M^{th}$ value of the interpolated result 31 is selected for output by the down sampler 28. Since M is a decimal number, the desired down sample point may fall between two consecutive points in sequence 31. In FIG. 8, two consecutive points 34 and 36 are shown with the selected output 35 falling in between. The resulting value for 35 is, in the most general case, a function of points 34 and 36. For image processing applications results of sufficient quality are produced by selecting the nearest point based on the smaller of the distance values 37 and 38 (FIG. 8). As a result, the selected output 34 deviates from the output value that would be produce by an FIR system that is restricted to integer down sample rates. The resulting transfer function error terms 39 are equal to the difference in amplitude between 34 and 35. The magnitude of the error term 39 is approximately inversely proportional to the up sample rate L.

Figure 6:
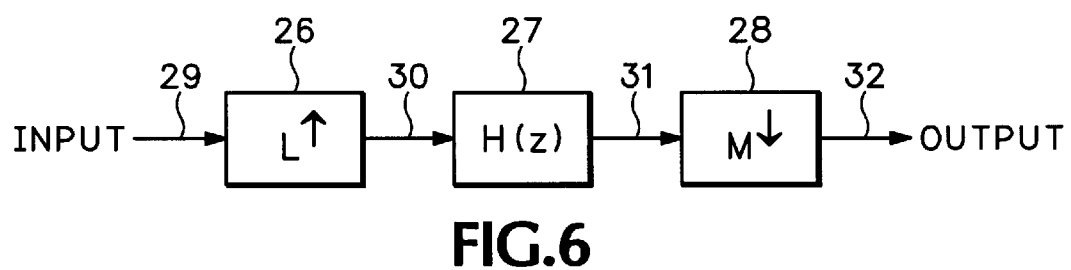
FIG. 6 depicts a multi-rate FIR scalar circuit.
Figure 9:
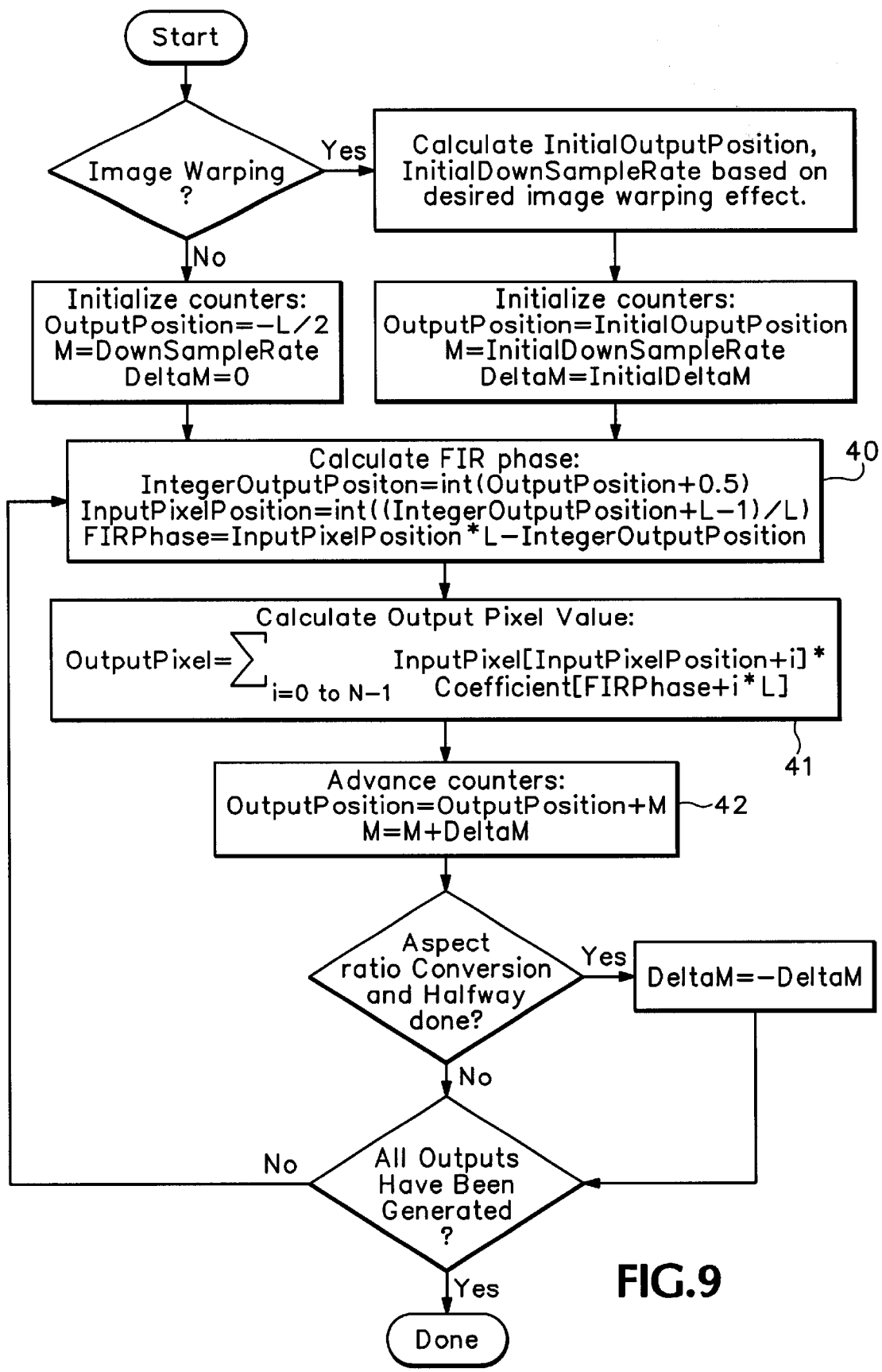
FIG. 9 is a flowchart of a sample rate converter process according to the present invention.

FIG. 9 outlines the sample rate conversion process for the circuits shown in FIGS. 6–8. Step 40 is equivalent to the FIR filter 27 and steps 40 and 42 together represent the up sampler 26 and the down sampler 28. Importantly, the only points of sequence 31 (FIG. 7) that are calculated correspond to actual outputs in sequence 32, that is, all the non-zero points in the sequence 31. As can be seen in the up sampled data 30, each output $O_m$ is only dependent on every $L^{th}$ coefficient of the FIR filter because all other coefficients multiply data values that are zero. Thus, $O_m = C_3 * I_n + C_7 * I_{n+1} + C_{11} * I_{n+2} + C_{15} * I_{n+3} + C_{19} * I_{n+4}$ in FIG. 7. In general, there are L possible sets of coefficients $S_{phase} = \{C_{phase}, C_{phase+L}, C_{phase+2L}, \ldots\}$ for all values of phase in the range 0 to L−1. For a given output, the required coefficient phase and input pixel position can be calculated according to step 40 in FIG. 9, viz:

Calculate FIR Phase:
  IntegerOutputPosition=int(OutputPosition+0.5)
  InputPixelPosition=int((IntegerOutputPosition+L−1)/L)
  FIRPhase=InputPixelPosition*L−IntegerOutputPosition Using decimal values of M allows very fine control of the resizing scale factor even when L is a fixed value. In the preferred embodiment $L=2^K$. Limiting the value L to a power of two reduces complexity of the phase calculation process shown in FIG. 9 by replacing the multiplication and division operation in step 40 with a shift-left-by-K operation and a truncate-to-integer operation followed by a shift-right-by-K operation with a zero fill. In addition, the phase calculation is simplified by limiting the length of the FIR filter to N*L where N is an integer and equals the number of multiplication operations required to compute an output result.

Figure 10:
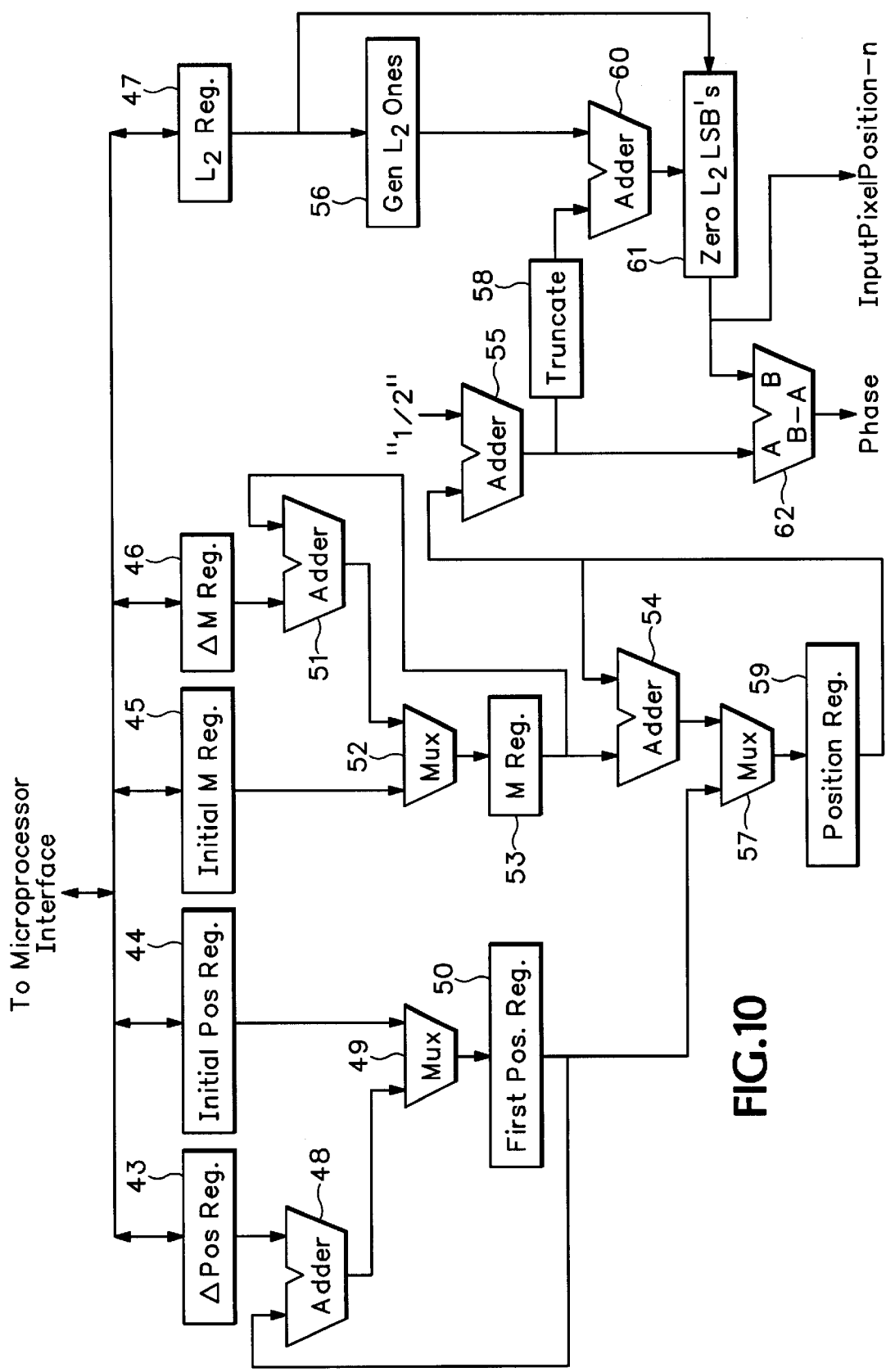
FIG. 10 is a simplified schematic diagram of a presently preferred embodiment of a FIR phase (coefficient memory address) calculation circuit.

The phase calculation circuit described in FIG. 10 generates a new FIR phase and a new input pixel position for each output pixel. Programming the control registers 43 through 47 via the microprocessor interface first initializes the circuit shown in FIG. 10. Once configured the circuit operates independently requiring no further input from the microprocessor (not shown). Once every frame of the image, the contents of register 44 (the initial position) is transferred into register 50 (the first position) by selecting this path on the mux 49. Similarly, the contents of register 45 (the initial down sample or M value) is transferred into register 53 (the current M value) by selecting this path on the mux 52. If image warping is desired, the delta position register 43 will contain a delta position value Δpos that indicates the amount the start position changes each line. The delta position value Δpos is used for image warping, such as keystone correction, and is preferably only implemented in the vertical scaling circuit. Image warping is explained in more detail below with reference to FIGS. 12 and 13. At the beginning of each line in the image, the select control (not shown) on mux 57 is set so that the contents of register 50 (first position register) are transferred into register 59, which determines the current position in the up sample 35 defined by the sequence 31 (FIG. 7). Referring again to FIG. 10, for each output pixel, the contents of position register 59 are advanced by the current down sample increment defined in register 53 (M register) using adder 54. The nearest integer up sample position in sequence 31 is determined by adding ½ to the value of register 59 using adder 55 and then truncating to an integer with truncating circuit 58. The nearest input pixel to the right of sample 35 is found by adding L−1 to the output of truncating circuit 58 using adder 60 and then zero filling $L_2$ least significant bits with circuit 61. Control register 47 specifies the value K, which defines the up sample rate $L=2^K$. The output of circuit 61 is equivalent to the InputPixelPosition*L, as defined above. Finally, the FIR phase is determined by subtracting the output of circuit 61 from the output of adder 55 in a subtraction circuit 62. The FIR phase is used to select a set of filter coefficients, as further explained below, for the terms that contribute (non-zero) to the current output pixel.

Figure 11A:
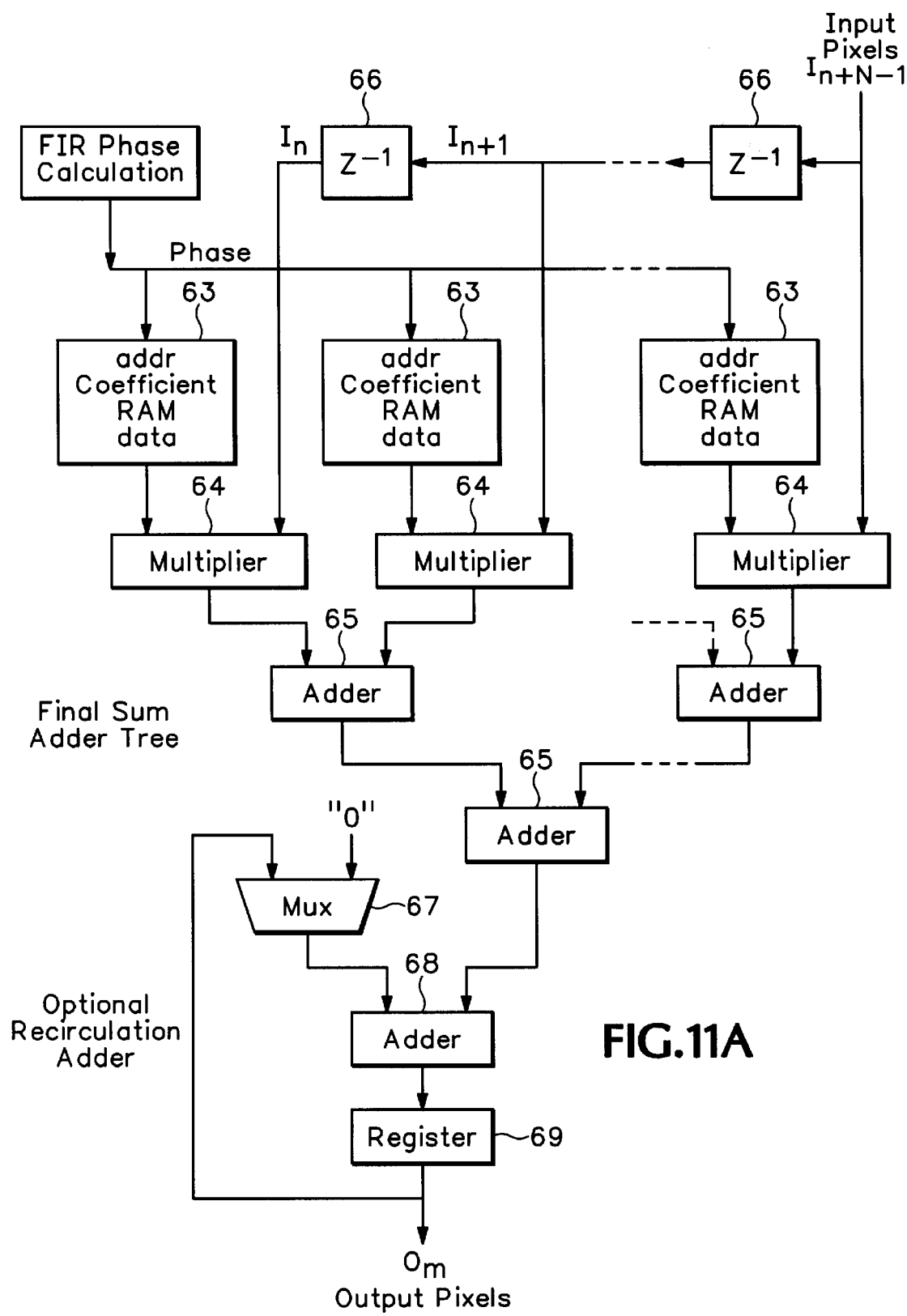
FIG. 11A is a simplified schematic diagram of a presently preferred embodiment of a horizontal scalar.

Using the FIR phase and input pixel position defined in FIG. 10, the circuit shown in FIG. 11A calculates the output pixel value for the case of a horizontal scalar 22. The FIR phase is used as an address to fetch coefficients from a coefficient memory, for example, storage RAMs 63. The input pixel position is used to control an input pixel delay line 66 by advancing this pipeline until the required non-zero input pixels are present. The output pixel value is then calculated using multipliers 64 and adders 65. The length of the FIR filter can be increased without using additional multipliers by using an optional recirculation adder 68 that is enabled by selecting the feedback path through multiplexer 67. Since the FIR filter length was restricted to N*L, each coefficient RAM need only contain R*L coefficients of the filter where R is the number of recirculations required to compute the final result.

Figure 11B:
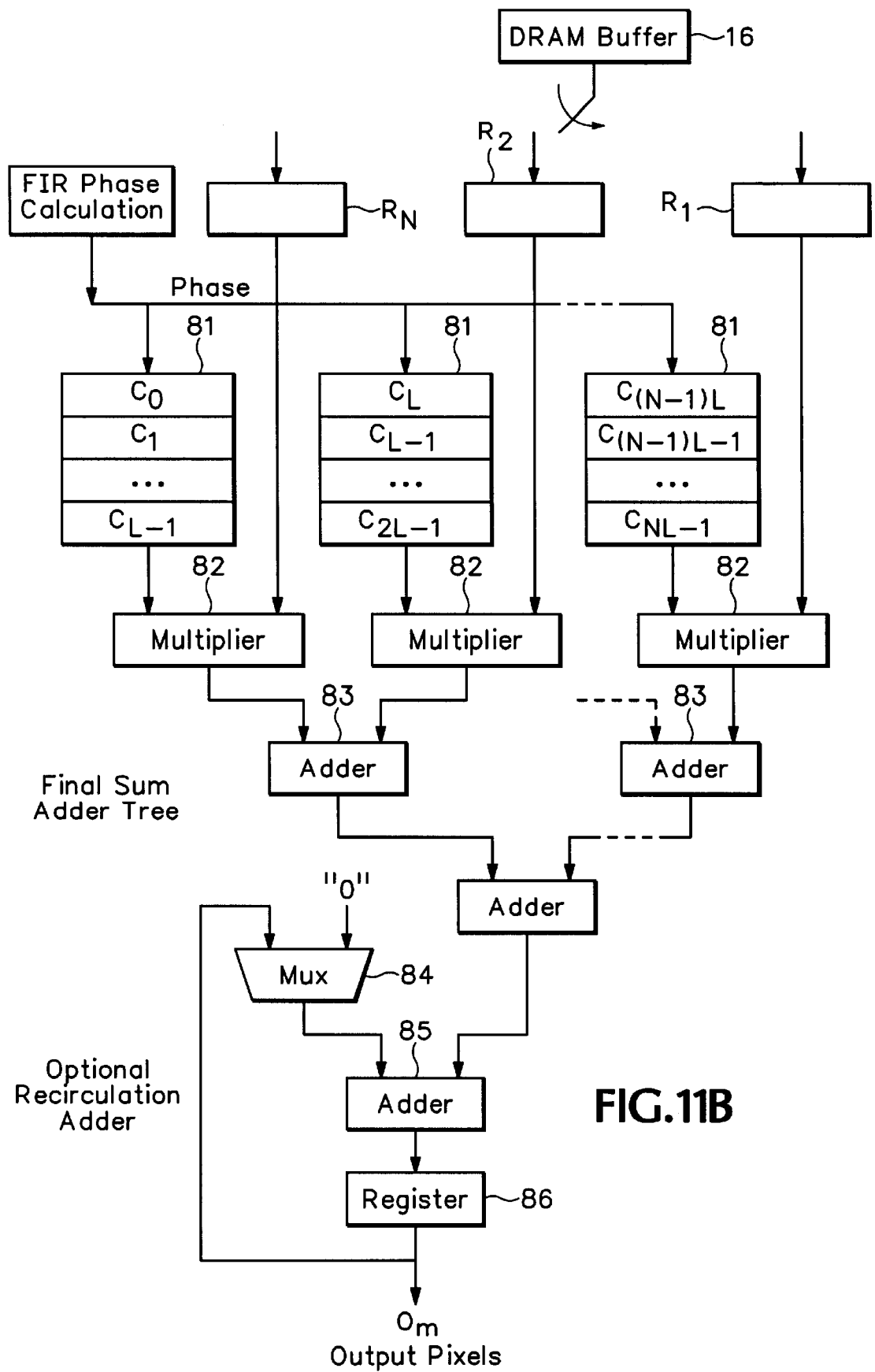
FIG. 11B is a simplified schematic diagram of a presently preferred embodiment of the vertical scalar shown in FIG. 3.

Likewise, using the FIR phase and input pixel position defined in FIG. 10, the circuit in FIG. 11B calculates the output pixel value for the case of a vertical scalar 17. The FIR phase is used as an address to fetch coefficients from a coefficient memory, for example, storage RAMs 81 as described above with reference to FIG. 7B. The input pixel position is used for reading the correct lines directly from frame memory 16.

As explained above, each of the output buffers R1, R2, . . . Rn contains the data from a line of data with the nth pixel of each line available at the same time to a multiplexer. The output pixel value is then calculated using multipliers 82 and adders 83. The length of the FIR filter can be increased using an optional recirculation adder 85 that is enabled by selecting the feedback path on multiplexer 84. Since the FIR filter length was restricted to N*L, each coefficient of RAM need only contain R*L coefficients of the filter where R is the number of recirculations required to compute the final result. In the preferred embodiment of the invention, vertical scaling is performed first, where the nth pixel of a series of lines or rows is factored to produce a single vertical value for these lines or rows. This value is then sent into the pipeline feeding the horizontal scalar 22.

After a vertical value is calculated, a new phase is calculated that defines the next set of coefficients to use for calculating the next vertical value. The data used for the next vertical value may advance to the next pixel in the rows. For the case of up sampling, since new lines are being created, the same pixels may be used to produce two vertical values for two separate output lines, though the weight each pixel is given will vary as the coefficients have been updated.

Referring to FIG. 6, the low pass filter 27 is designed to have a cutoff that is the smaller of 1/M or 1/L. In the image magnification case where L>M, the cutoff is 1/L. Since L is a fixed constant, only one set of coefficients is required. For designs that only require up scaling, these limitations allow for the complexity of the multipliers to be reduced. For designs that require down scaling, programmable filter coefficients are preferred since 1/M determines the cutoff and the value M is not fixed. A significant issue with the design of FIR filters for image processing applications is the filter's response to a constant input. In this case the output is simply the sum of the coefficients for a given phase times the constant input value, i.e., Output=$(C_{phase}+C_{phase+L}+C_{phase+2L}+ \ldots )$*Input. If all phases of the FIR filter do not sum to the same value then image patterning will be apparent. To solve this problem each phase of the filter is normalized so that all of the coefficients add up to the same value.

The circuit shown in FIG. 10 can also support image warping effects, such as keystone correction or aspect ratio conversion. Keystone correction compensates for the widening at the top of an image created when projecting an image from an overhead projector. Turning the projected image from a rectangle into a trapezoid compensates for the keystone effect. Aspect ratio conversion is used on non-linear image conversions where the image is stretched or condensed to the new format more significantly on the outer regions than in the center of the image where the alteration to the image would be more noticeable. For example, if the image is reformatted for a format that is wider, but the same height as the original format, the aspect of the image changes. A stretching effect can be done in a non-linear fashion to preserve the integrity of the center of the image at the expense of the outer portions of the image.

A more general method of image warping involves calculating M as a function of the current output pixel position X,Y (i.e., M=f(X,Y)). For all cases of image warping to prevent aliasing and imaging artifacts, the FIR filter cutoff is the smaller of 1/M' or 1/L where M' is the largest down sample rate used in the image warp, i.e., M'=max(f(X,Y)). Any standard technique for FIR filter design may be used; window methods such a Kaiser, Harris, Hanning, and Hamming work well.

Figure 12:
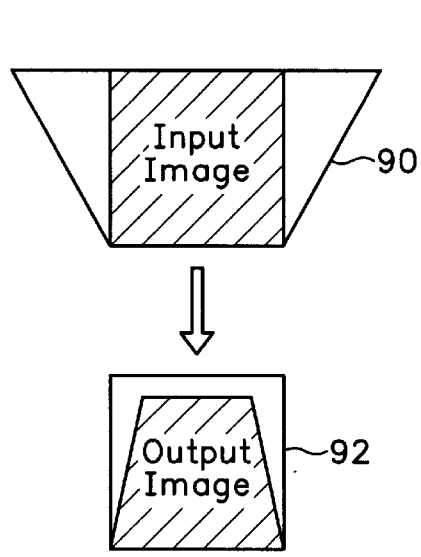
FIG. 12 illustrates the effect of the image warping function when used for keystone correction.

When image warping is used in the present invention, the delta position Δpos in register 43 is non-zero. For each line, the delta position register 43 (FIG. 10) is added to the current first position register 50 to calculate the new first position value. The first position may increase or decrease from line to line based on the narrowing or widening of the keystone effect. The down sample value M may also vary when using image warping effects. A value ΔM is added to the down sample value M stored in register 53 in the feedback loop of adder 51 if the ΔM value is non-zero. In one of two cases of keystoning—where the output image 92 is as shown in FIG. 12—as fewer input pixels are needed in each successive line, the down sample value M will get smaller because more pixels are skipped at the top than at the bottom. For keystoning, the down sample value M is constant within each line but varies as the lines as consecutively processed. The down sample value M may vary in a variety of different ways, including linearly, non-linearly, and parabolically, or may be determined using a look up table. In the preferred embodiment, the down sample value M is constant within each line but increases or decreases linearly as the lines are consecutively processed. Since the down sample value M may vary only slightly over a high number of lines it is important to have high precision to create a smooth correction. For example, if the down sample value M varies from 2.5 to 2.0 over 1000 lines of data, the keystone rate will change for each line of data by 0.0005. The implemented version of the hardware tracks the precision of the down sample value to 33 bits.

For aspect ratio conversion, the outer regions are distorted, once again needing fewer pixels and a larger M value than in the center of the image. As the pixels are processed toward the center, the down sample value M will decrease until reaching a halfway point. At the halfway point, the value M will again increase.

Figure 13:
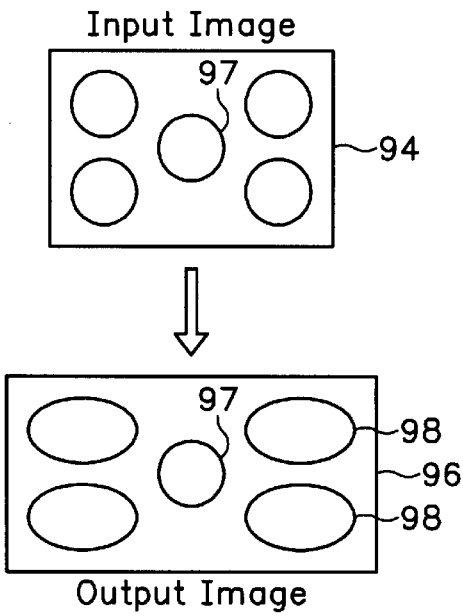
FIG. 13 illustrates the effect of the image warping function when used for aspect ratio conversion.

FIGS. 12 and 13 illustrate two image warping effects that are achieved by varying the decimal down sample value or rate and the scalar starting position as described above. In FIG. 12, keystone correction is illustrated. Keystone correction involves incrementing or decrementing the horizontal down sample value M and start position at each line. The vertical down sample value M is also incremented or decremented each line to preserve the aspect ratio of the image from top to bottom. In the preferred embodiment, the down sample value M is incremented linearly. The following equations can be used to calculate the increment/decrement amounts based on a desired angle of keystone correction.

Definitions:
  α=Keystone correction amount (+ or −)
  H=Input Image Height
  W=Input Image Width
  $N_x$=Number of horizontal multiplication's (FIR Length= $N_x * L_x$)
  $L_{x0}$=Initial horizontal up sample value
  $M_{x0}$=Initial horizontal down sample value
  $L_x$=Horizontal up sample value
  $M_x$=Horizontal down sample value
  $\Delta M_x$=Horizontal down sample rate line increment
  $X_0$=Initial horizontal start position
  $\Delta X$=Horizontal start position line increment
  $Y_0$=Initial vertical start position
  $M_{y0}$=Initial vertical down sample value
  $L_y$=Vertical up sample value
  $M_y$=Vertical down sample value $\Delta M_y$=Vertical down sample value line increment Equations:
  if α>=0 then
    $\Delta M_x = (M_{x0} * \alpha)/((1-\alpha)*(H-1))$
    $\Delta X = -(L_{x0} * W * \Delta M_x)/(2 * M_{x0})$
    $X_0 = -(N_x * L_{x0})/2$
    $M_x = M_{x0} - \Delta M_x * (H-1)$
    $\Delta M_y = (\alpha * M_{y0}^2)/(H * L_y)$
    $M_y = M_{y0}$
    $Y_0 = -(N_y * L_{y0})/2$ else
    $\Delta M_x = -(M_{x0} * \alpha)/((1-\alpha)*(H-1))$
    $\Delta X = (L_{x0} * W * \Delta M_x)/(2 * M_{x0})$
    $X_0 = -(N_x * L_{x0})/2 - (H-1) * \Delta X$
    $M_x = M_{x0} - \Delta M_x * (H-1)$
    $\Delta M_y = -(\alpha * M_{y0}^2)/(H * L_y)$
    $M_y = M_{y0} - \Delta M_y * (H-1)$
    $Y_0 = -(N_y * L_{y0})/2$ end if.

FIG. 13 illustrates aspect ratio conversion. In this case, the horizontal down sample value M is incremented after each output until the middle of the image is reached. Thereafter, the down sample value is decremented until the end the line. The starting down sample amount and increment/decrement amount are generally set so that near the middle of the image the horizontal resizing ratio L/M is approximately equal to one (assuming no image scaling). As you approach the image edges, the magnification increases as M becomes smaller. Doing so results in correct aspect ratios in the middle and distorted aspect ratios near the edge of the image, i.e., circles remain circles in the middle and become ovals as you approach the edge.

Figure 14:
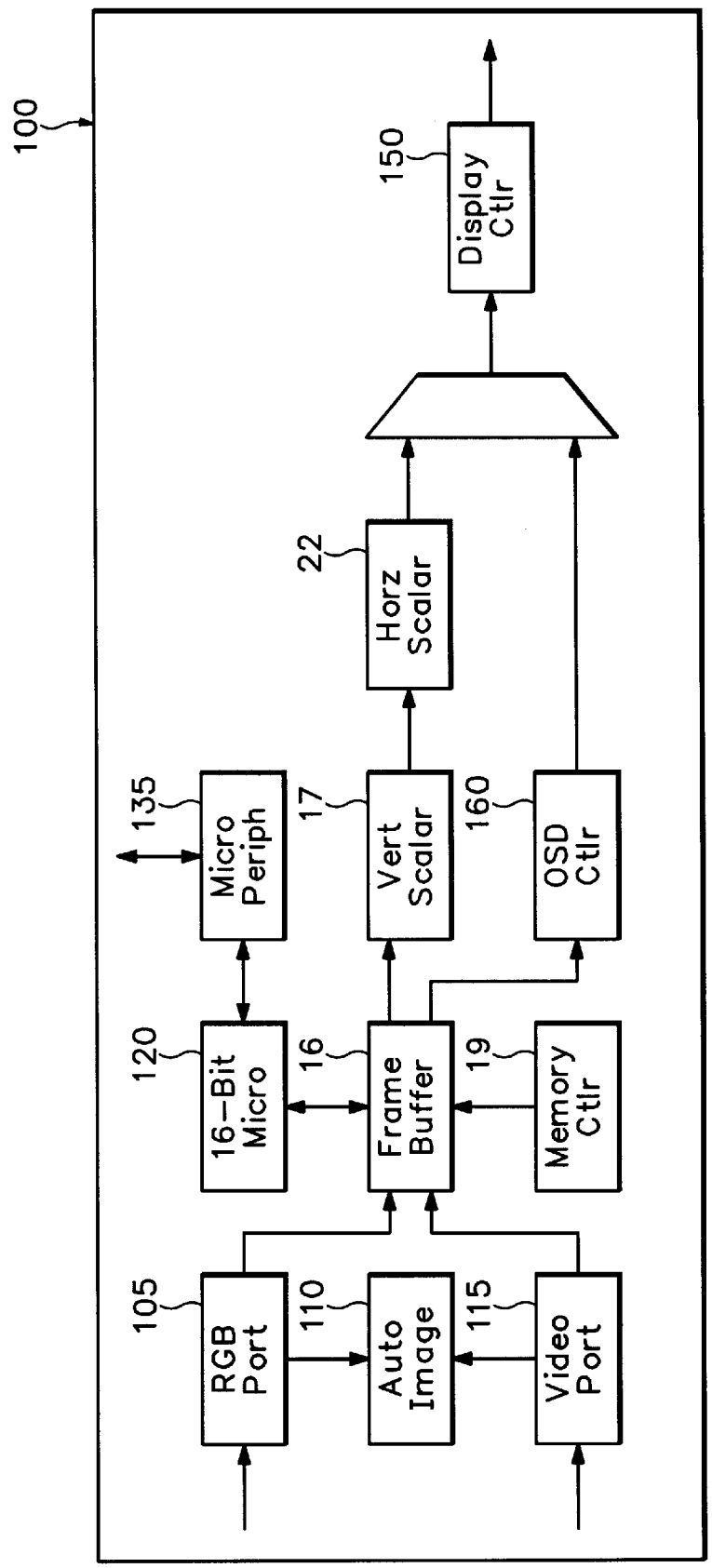
FIG. 14 is a block diagram of a display system controller incorporating the image scaling circuit shown in FIG. 3.

FIG. 14 is a block diagram of a display system controller 100 incorporating the vertical scaling circuit 20 discussed above. Referring to FIG. 14, the display system controller 100 includes an RGB input port 105, video port 115, automatic image optimizer 110, microprocessor 120, frame memory 16, memory controller 19, microprocessor peripherals 135, on-screen display controller 145, display controller 150, and vertical and horizontal scalars 17 and 18, respectively. The display system controller 100 is preferably implemented on a special-purpose monolithic integrated circuit.

Figure 15:
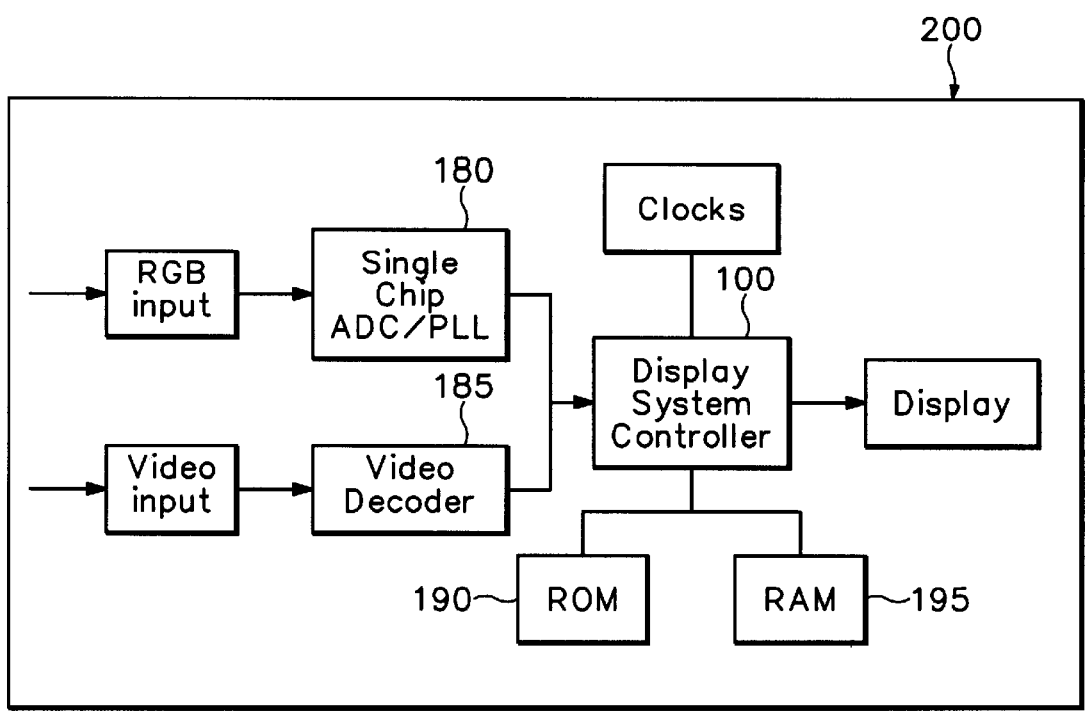
FIG. 15 is a block diagram of a display system incorporating the display system controller shown in FIG. 14.

The RGB input port 105 receives digital data for a pixelated image previously converted from an analog image source (not shown). The preferred RGB port 105 receives data at up to 230 Mpixels/second thereby supporting a variety of display modes up to UXGA. The RGB port 105 receives RGB data having 1 or 2, 24-bit pixels per clock. The RGB port 105 includes a sync processing circuit that can operate from separate, composite, or sync-on-green sync signals. The RGB port 105 supports both interlaced and progressive scanned RGB inputs and half-frequency sampling for lower cost display system implementations. Half-frequency sampling reduces system cost by allowing the use of 100 MHz analog to digital converters—FIG. 15 shows a display system including an analog-to-digital converter 180—while maintaining UXGA image capturing capabilities. Half-frequency sampling involves capturing even pixels on one frame and odd pixels on the following frame.

The video port 115 receives YUV or RGB digital data for a pixelated image previously converted from an analog image source (not shown). The video port 115 includes a variety of image processing features including intra-field and inter-field video de-interlacing, double buffered and frame locked image capture modes, and simultaneous signal capture of up to 30 Mpixels/second with RGB input port 105. The video input port 115 includes a rotational feature that allows rotating a received image by 90 degrees. The 90-degree image rotation is made possible by the high internal memory bandwidth in the display system controller 100. The video port 115 supports all common video decoder integrated circuits.

The automatic image optimizer 110 monitors and characterizes the digital input signals received by the RGB port 105 and the video port 115. The automatic image optimizer 110 generates the necessary control signals to allow the RGB port 105 and the video port 115 to interface with the image sources. The control signals include a Phase Locked Loop (PLL) reference signal, a PLL feedback pulse, a PLL coast control signal that disables the PLL during a vertical sync interval, and a Direct Current (DC) restore clamp pulse. The automatic image optimizer 10 sets the clock frequency, the clock phase, and the image size, position, and gain without requiring user intervention. The preferred automatic image optimizer 110 works with a variety of external PLL devices (FIG. 6) to regenerate a pixel sample clock from the video horizontal synchronization signal.

The microprocessor 120 performs all of the control functions necessary for the display system controller 100. The microprocessor 120 is preferably an on-chip general-purpose 16-bit, x86-compatible processor. The microprocessor 120 preferably runs at clock rates of up to 50 MHz and has a one-megabyte address space.

A fill complement of microprocessor peripherals 135 are included in the display system controller 100. In the preferred embodiment, the microprocessor peripherals 135 include three 8-bit I/O ports, two 16-bit timers, a watchdog timer, a programmable interrupt controller, an RS-232 serial port, an infrared remote control decoder, a glue-less ROM & RAM interface, and decode logic for external peripherals. The microprocessor peripherals 135 include in the system 100 are on-chip allowing a complete microprocessor system to be implemented by merely adding external read-only and random access memory.

The vertical and horizontal scalars 17 and 22, as mentioned above, scale the captured image up or down to any arbitrary resolution. Vertical and horizontal scale factors are completely independent. The scalars 17 and 22 allow a wide range of captured image resolutions to be displayed on a fixed pixel resolution display device. For example, in the case of an XGA LCD desktop monitor, the scalars 17 and 22 can be used to perform the following resizing factors:

NTSC up to XGA
VGA up to XGA
SVGA up to XGA
XGA to XGA (no scaling)
SXGA down to XGA
UXGA down to XGA
HDTV down to XGA The display system controller 100 includes an OSD controller 145. The OSD controller 145 fills and draws OSD bitmaps into the frame memory 16. An overlay function included in the OSD controller 145 allows transparent and semi-transparent overlays to be displayed. The OSD controller 145 selects on a pixel-by-pixel basis whether to display the scaled, captured image or the OSD bitmap stored in the frame memory 16. The OSD controller 145 can be used to implement simple, opaque, character-based menu systems or complex, bitmap-based, menus with transparent backgrounds. Advanced functions such as a translucent highlighter pen and embossed transparent logos are also possible. The OSD controller 145 preferably supports up to 16 bits per pixel or 64K colors.

The display controller 150 generates timing signals to control the pixelated output display device. The display timing is fully programmable and is completely independent of the image being captured. The display controller 150 supports display refresh rates between about 50 Hz to over 100 Hz. The displayed image may be flipped horizontally or vertically. The display controller 150 includes a color space expander that allows full color display on displays with fewer than 8-bits per color channel. Programmable color lookup tables are provided to allow for gamma correction, i.e., matching the display's color space to the desired range. Gain and contrast controls are also included in the controller 150. Single and dual pixel outputs are supported at up to UXGA (1600×1200) resolution.

The display system controller 100 includes a variety of circuits that support unique features not shown in FIG. 14. For example, a picture-in-picture feature allows the input image received at the video port 115 to be simultaneously displayed in the same window as the input image received at the RGB port 105. The captured image can also be panned and zoomed by the user. Additionally, an average picture level (APL) monitoring circuit allows monitoring the overall brightness of the pixels sent to the display.

FIG. 15 illustrates a typical system configuration for a flat panel monitor using the display system controller 100 shown in FIG. 14. The system 200 includes an analog-to-digital (ADC) converter or phase locked loop (PLL) circuit 180 for receiving the RGB analog input signal from an image source (not shown). The ADC/PLL circuit converts the analog input signal to a digital signal and provides the digital signal to the display system controller 100. A video decoder 185 receives an analog video image from an analog video source (not shown). Read-only and random access memories 190 and 195, respectively, are coupled to the display system controller 100 and store bitmaps, FIR filter coefficients, and the like.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A pixelated display controller integrated circuit, comprising:
   an image scalar circuit for vertically scaling digital data of a pixelated image;
   a frame memory coupled to the image scaling circuit adapted to store digital image data frames; and
   a plurality of buffers positioned between the image scalar and the frame memory, each buffer storing a corresponding portion of the digital image data frame such that the image scalar circuit parallel accesses the portions of the digital image data frame stored in the plurality of buffers.

2. The pixelated display controller of claim 1 wherein the image scalar circuit includes a vertical scalar circuit for scaling the digital image data in a vertical direction.

3. The pixelated display controller of claim 1 wherein the frame memory comprises DRAM memory.

4. The pixelated display controller of claim 3 wherein the frame memory includes an image portion for storing the digital image frames, an OSD portion for storing OSD bitmaps for access by an OSD controller, a microprocessor portion for storing microprocessor data for access by a microprocessor, or a combination thereof.

5. The pixelated display controller of claim 3 wherein the frame memory comprises at least two memory banks, each bank including a plurality of rows and columns, each row storing portions of a plurality of lines of the digital image data.

6. The pixelated display controller of claim 5 wherein each row stores portions of a plurality of digital data lines such that corresponding portions of sequential digital data lines are stored in no more than one row in each bank thereby minimizing row faults.

7. The pixelated display controller of claim 1 including an input buffer coupled to an input side of the frame memory for buffering the digital image data.

8. The pixelated display controller of claim 1 wherein each buffer sequentially accesses the frame memory and buffers portions of the corresponding digital image data lines transferred from the frame memory.

9. The pixelated display controller of claim 1 wherein each buffer is a FIFO buffer.

10. A vertical scaling circuit for vertically scaling digital data of a pixelated image, comprising:
    a frame memory for storing the digital data, the digital data being divided into a plurality of frames, each frame including a plurality of lines;
    a plurality of output buffers, each output buffer adapted to store at least a portion of a selected line; and
    a vertical scalar coupled to the plurality of output buffers adapted to vertically scale the pixelated image by parallel accessing the portions of the selected lines stored in each of the output buffers;
    wherein the frame memory, the plurality of output buffers, and the vertical scalar are embedded in an integrated circuit.

11. The vertical scaling circuit of claim 10 wherein the frame memory comprises DRAM-type memory.

12. The vertical scaling circuit of claim 11 wherein the frame memory comprises at least two memory banks, each bank including a plurality of rows and columns, each row storing portions of sequential digital data lines.

13. The vertical scaling circuit of claim 12 wherein each row stores portions of sequential digital data lines such that corresponding portions of sequential digital data lines are stored in no more than one row in each bank thereby minimizing row faults.

14. The vertical scaling circuit of claim 11 wherein the frame memory includes an image portion for storing the digital image frames, an OSD portion for storing OSD bitmaps for access by an OSD controller, a microprocessor portion for storing microprocessor data for access by a microprocessor, or a combination thereof.

15. The vertical scaling circuit of claim 10 wherein the frame memory includes a single output port and wherein each output buffer sequentially accesses the frame memory through the output port.

16. The vertical scaling circuit of claim 10 wherein each output buffer is a FIFO buffer.

17. The vertical scaling circuit of claim 10 wherein the plurality of output buffers includes an input bandwidth and an output bandwidth, the input bandwidth being equal to or greater than the output bandwidth.

18. The vertical scaling circuit of claim 10 including an input buffer coupled to an input side of the frame memory for buffering the digital data, the input buffer being embedded in the integrated circuit.

19. The vertical scaling circuit of claim 18 wherein the input buffer is a FIFO buffer.

20. A method for vertically scaling digital data representative of a pixelated digital image, comprising:
    embedding a frame memory and a vertical scalar in an integrated circuit;
    storing the digital data in the frame memory;
    transferring portions of selected digital data lines from the frame memory to a corresponding output buffer until a plurality of output buffers stores corresponding portions of sequential digital data lines; and
    scaling the pixelated digital image with the vertical scalar by parallel accessing the portions of selected data lines stored in the plurality of output buffers.

21. The method of claim 20 wherein storing the digital data in the frame memory includes storing the digital data in a DRAM memory.

22. The method of claim 21 wherein storing the digital data in a DRAM frame buffer includes storing the digital data in at least two memory banks, each bank including a plurality of rows and columns, each row storing corresponding portions of sequential digital data lines.

23. The method of claim 22 wherein storing the digital data in at least two memory banks includes storing the data in the plurality of rows such that corresponding portions of sequential digital data lines are stored in no more than one row in each bank thereby minimizing row faults.

24. The method of claim 21 wherein storing the digital data in the frame memory includes storing a digital data frame in the frame memory for conversion from an input refresh rate to an output refresh rate, storing OSD bitmaps in the frame memory, or storing microprocessor data in the frame memory.

25. The method of claim 20 wherein the frame memory includes an output port and wherein transferring portions of selected digital data lines includes having each output buffer sequentially access the output port.

26. The method of claim 20 wherein transferring portions of digital data lines includes transferring portions of digital data lines from the frame memory to a corresponding FIFO output buffer.

27. The method of claim 20 including buffering the data in an input buffer.

28. The method of claim 27 wherein buffering the data in an input buffer includes buffering the data in a FIFO input buffer.

29. The method of claim 20 wherein transferring portions of selected digital data lines occurs at a higher bandwidth than scaling the pixelated image by accessing the portions of selected digital lines.

* * * * *

UNITED STATES PATENT AND TRADEMARK OFFICE
CERTIFICATE OF CORRECTION

PATENT NO. : 6,611,260 B1
DATED : August 26, 2003
INVENTOR(S) : Greenberg et al.

It is certified that error appears in the above-identified patent and that said Letters Patent is hereby corrected as shown below:

Title page,
Item [60], Related U.S. Application Data, should include -- continuation of application No. 09/198,314, filed on Nov. 23, 1998 --.
Item [56], References Cited, U.S. PATENT DOCUMENTS, "6,125,199 A 9/2000 Sato et al. ...358/518" should read -- 6,125,199 A 9/2000 Sato et al. ...382/162 --, "6,175,592 B1 1/2001 Kim et al. ...348/616" should read -- 6,175,592 B1 1/2001 Kim et al. ...375/240 --.

Column 1,
Line 17, "for ok digital image" should read -- for digital image --.

Column 6,
Line 32, "the go frame memory" should read -- the frame memory --.

Column 13,
Line 54, "optimizer 10 sets" should read -- optimizer 110 sets --.
Line 66, "A fill complement" should read -- A full complement --.

Column 15,
Line 55, "of claim 1 wherein" should read -- of claim 8 wherein --.

Signed and Sealed this

Fifth Day of July, 2005

JON W. DUDAS
*Director of the United States Patent and Trademark Office*